US011846789B2

(12) United States Patent
Tseng et al.

(10) Patent No.: US 11,846,789 B2
(45) Date of Patent: Dec. 19, 2023

(54) ZOOM LENS MODULE

(71) Applicant: GUANGZHOU LUXVISIONS INNOVATION TECHNOLOGY LIMITED, Guangzhou (CN)

(72) Inventors: Cheng-Te Tseng, Guangzhou (CN); Sheng-Chieh Yang, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 152 days.

(21) Appl. No.: 17/564,875

(22) Filed: Dec. 29, 2021

(65) Prior Publication Data

US 2022/0120943 A1    Apr. 21, 2022

Related U.S. Application Data

(60) Provisional application No. 63/145,552, filed on Feb. 4, 2021.

(30) Foreign Application Priority Data

Dec. 8, 2021 (CN) .......................... 202111491493.X

(51) Int. Cl.
*G02B 3/12* (2006.01)
*G02B 13/00* (2006.01)
*G02B 26/00* (2006.01)

(52) U.S. Cl.
CPC ............. *G02B 3/12* (2013.01); *G02B 13/009* (2013.01); *G02B 13/0075* (2013.01); *G02B 26/005* (2013.01)

(58) Field of Classification Search
CPC .... G02B 3/12; G02B 13/0075; G02B 13/009; G02B 26/005; G02B 3/14; G02B 7/04; G02B 26/004
See application file for complete search history.

(56) References Cited

U.S. PATENT DOCUMENTS

2020/0285077 A1* 9/2020 Leuenberger .......... G02C 7/085

* cited by examiner

*Primary Examiner* — James C. Jones
(74) *Attorney, Agent, or Firm* — Birch, Stewart, Kolasch & Birch, LLP

(57) ABSTRACT

A zoom lens module is provided and includes a liquid lens, a rigid lens, and an actuator. The liquid lens has two side surfaces opposite to each other. An optical axis of the liquid lens passes through the two side surfaces, and at least one of two side surfaces is a deformable side surface. The rigid lens has a shaping surface being not flat. The rigid lens is arranged inside or outside the liquid lens, and the shaping surface faces the deformable side surface. The actuator is connected to one of the liquid lens and the rigid lens to drive the deformable side surface and the shaping surface to move relative to each other, so that the shaping surface contacts and presses the deformable side surface to be deformed.

21 Claims, 10 Drawing Sheets

ZOOM LENS MODULE

CROSS-REFERENCES TO RELATED APPLICATIONS

This application claims the benefit of U.S. provisional application Ser. No. 63/145,552, filed on Feb. 4, 2021 and claims the priority of Patent Application No. 202111491493.X filed in China, P.R.C. on Dec. 8, 2021. The entirety of the above-mentioned patent applications are hereby incorporated by references herein and made a part of the specification.

BACKGROUND

Technical Field

The instant disclosure relates to a liquid lens, and in particular, to a zoom lens module.

Related Art

As shown in FIG. 1, a liquid lens 1 known to the inventor is manufactured by sealing a light-permissible liquid 2 in a deformable container 3. A side surface of the container 3 is sealed by attaching a transparent glass 4, and the other side surface of the container 3 is sealed by attaching a deformable film 5. The refractive index of the film 5 approximately corresponds to the refractive index of the light-permissible liquid 2. To achieve the zooming of the liquid lens 1, a shaping member 6 is applied to press the film 5 to allow the film 5 to be deformed, so that the surface curvature of the film 5 is changed, thereby changing the focal length of the liquid lens 1. Therefore, the optical zooming can be achieved within a very small space.

The shaping member 6 is arranged on the optical path. Therefore, the shaping member 6 has a hollow region for passing through the light. When the shaping member 6 presses the film 5, the shaping member 6 directly presses the edge region of the surface of the film 5, so that the edge region is deformed. On the other hand, a middle region of the film 5 corresponding to the hollow region is not directly pressed but stands a bending stress. Hence, the junction between the edge region and the middle region forms a bent corner, and the stress tends to be concentrated on the bent corner, thereby allowing the film 5 to be broken easily.

Moreover, the edge region of the surface of the film 5 is directly forced and shaped by the shaping member 6; while the middle region stands the bent stress to be deformed. As a result, the surface curvature of the edge region of the film 5 and the surface curvature of the middle region of the film 5 are not identical with each other. Furthermore, in some cases, forces are not applied to the middle region of the film 5, and the surface curvature across the middle region is even not changed and flat. Consequently, the curvature change of the middle region cannot be controlled easily, resulting in unstable optical zooming performances.

SUMMARY

In view of this, a zoom lens module is provided. In one embodiment, the zoom lens module comprises a liquid lens, a rigid lens, and an actuator. The liquid lens has two side surfaces opposite to each other. An optical axis of the liquid lens passes through the two side surfaces, and at least one of two side surfaces is a deformable side surface. The rigid lens has a shaping surface being not flat. The rigid lens is arranged inside or outside the liquid lens. The shaping surface faces the deformable side surface. The actuator is connected to one of the liquid lens and the rigid lens to drive the deformable side surface and the shaping surface to move relative to each other, so that the shaping surface contacts and presses the deformable side surface to be deformed.

In one or some embodiments of the instant disclosure, the rigid lens is arranged outside the liquid lens, and the shaping surface is an outward convex curved surface.

In one or some embodiments of the instant disclosure, the liquid lens comprises a frame, a rigid transparent plate, a lower film, and a light-permissible liquid. The frame has a hollow region in communication with two faces of the frame. The rigid transparent plate and the lower film are respectively formed as the two side surfaces of the liquid lens. The lower film is formed as the deformable side surface. The light-permissible liquid is filled in the hollow region.

In one or some embodiments of the instant disclosure, the zoom lens module further comprises a shaping member. The rigid lens is arranged on the shaping member, and the shaping member is adapted to be moved toward the lower film.

In one or some embodiments of the instant disclosure, the actuator is a linear actuator, the linear actuator is connected to the shaping member, and the linear actuator is adapted to drive the shaping member to move toward the lower film.

In one or some embodiments of the instant disclosure, the actuator is a linear actuator, the linear actuator is directly connected to the rigid lens, and the linear actuator is adapted to drive the rigid lens to move toward the lower film.

In one or some embodiments of the instant disclosure, the rigid lens is arranged inside the liquid lens, and the shaping surface is an outward convex curved surface.

In one or some embodiments of the instant disclosure, the rigid lens is fixedly arranged in the hollow region and immersed in the light-permissible liquid, and the shaping surface faces the lower film.

In one or some embodiments of the instant disclosure, a shaping member is arranged outside the liquid lens and corresponds to the lower film. The shaping member surrounds a light-permissible region, so that the optical axis of the liquid lens passes through the light-permissible region. The actuator is connected to the shaping member to drive the shaping member to move toward the lower film, so that a portion of the lower film is moved toward the shaping surface, and the rigid lens presses the lower film to allow the lower film to attach to the shaping surface.

In one or some embodiments of the instant disclosure, the actuator comprises a liquid pump and a pipeline. The liquid pump is in communication with a liquid space through the pipeline and is adapted to suction the light-permissible liquid form the liquid space or to pump the light-permissible liquid to the liquid space, so that an amount of the light-permissible liquid in the liquid space is adjustable.

In one or some embodiments of the instant disclosure, the two side surfaces of the liquid lens are deformable side surfaces, and the zoom lens module comprises two of the rigid lenses and two of the actuators. The two rigid lenses are arranged outside the liquid lens, and the shaping surface of each of the two rigid lenses faces a corresponding one of the two deformable side surfaces. The two actuators are respectively connected to the two rigid lenses, so that each of the two actuators is adapted to drive a corresponding one of the two rigid lenses to move toward a corresponding one of the two deformable side surfaces, and each of the two shaping surfaces contacts and presses the corresponding one of the two deformable side surfaces to be deformed.

In one or some embodiments of the instant disclosure, the liquid lens comprises a frame, an upper film, a lower film, and a light-permissible liquid. The frame has a hollow region in communication with two faces of the frame. The upper film and the lower film are respectively at the two faces of the frame to seal the hollow region. The upper film and the lower film are respectively formed as the two deformable side surfaces. The light-permissible liquid is filled in the hollow region.

In one or some embodiments of the instant disclosure, the zoom lens module comprises two of the rigid lenses and two of the actuators, and the liquid lens comprises a frame, a rigid transparent plate, an upper film, a lower film, and a light-permissible liquid. The frame has a hollow region in communication with two faces of the frame. The rigid transparent plate is arranged in the hollow region to divide the hollow region into an upper region and a lower region respectively corresponding to the two faces. The upper film is arranged in the upper region, and a first liquid space is between the rigid transparent plate and the upper film. The lower film is arranged in the lower region. A second liquid space is between the rigid transparent plate and the lower film, and the first liquid space is not in communication with the second liquid space. The light-permissible liquid is filled in the first liquid space and the second liquid space. The upper film and the lower film are respectively formed as deformable side surfaces. The rigid lenses are fixed in the frame and arranged outside the first liquid space and the second liquid space. The two shaping surfaces of the two rigid lenses respectively face the upper film and the lower film.

In one or some embodiments of the instant disclosure, each of the two actuators comprises a liquid pump and a pipeline. One of the two liquid pumps is in communication with the first liquid space through one of the two pipelines and is adapted to suction the light-permissible liquid from the first liquid space or to pump the light-permissible liquid to the first liquid space. The other one of the two liquid pumps is in communication with the second liquid space through the other one of the two pipelines and is adapted to suction the light-permissible liquid from the second liquid space or to pump the light-permissible liquid to the second liquid space, so that an amount of the light-permissible liquid in the first liquid space and an amount of the light-permissible liquid in the second liquid space are adjustable.

In one or some embodiments of the instant disclosure, each of the two shaping surfaces is an inward concave curved surface.

In one or some embodiments of the instant disclosure, the liquid lens comprises a frame, a flexible liquid container, a rigid transparent plate, and a light-permissible liquid. The frame has a hollow region in communication with two faces of the frame. The flexible liquid container is movably arranged in the hollow region. The flexible liquid container has an upper film and a lower film opposite to the upper film. The upper film and the lower film are formed as the two side surfaces of the liquid lens. The rigid transparent plate is movably and correspondingly arranged in the hollow region. The rigid transparent plate contacts the lower film to support the flexible liquid container. The light-permissible liquid is filled in the flexible liquid container. The rigid lens is arranged on the frame and corresponds to the hollow region. The shaping surface of the rigid lens faces the upper film. The actuator is adapted to drive the rigid transparent plate to move toward the rigid lens, so that the flexible liquid container is lifted up by the actuator to drive the upper film to move toward the shaping surface.

In one or some embodiments of the instant disclosure, the liquid lens comprises a liquid container, a lower rigid transparent plate, and a light-permissible liquid. The liquid container has an upper film. The upper film is flexible and is formed as the deformable side surface. The lower rigid transparent plate is adapted to support the liquid container. The light-permissible liquid is filled in the liquid container. The rigid lens is arranged in the liquid container and is immersed in the light-permissible liquid. The shaping surface contacts the upper film, so that the upper film is normally attached to the shaping surface. The actuator is adapted to allow the light-permissible liquid to be filled between the upper film and the shaping surface.

In one or some embodiments of the instant disclosure, the zoom lens module further comprises an upper rigid transparent plate arranged above the upper film. The upper rigid transparent plate is spaced from the upper film with a gap.

In one or some embodiments of the instant disclosure, the liquid container further comprises a lower film. The upper film and the lower film enclose the light-permissible liquid. The lower rigid transparent plate is adapted to contact the lower film to support the liquid container, and a bottom surface of the rigid lens contacts the lower film.

In another embodiment of the instant disclosure, a zoom lens module is provided, and the zoom lens module comprises a liquid lens and two actuators.

The liquid lens has two side surfaces opposite to each other. An optical axis of the liquid lens passes through the two side surfaces, and at least one of the two side surfaces is a deformable side surface. The liquid lens comprises a frame, a rigid transparent plate, an upper film, a lower film, two fixation members, and a light-permissible liquid. The frame has a hollow region in communication with two faces of the frame. The rigid transparent plate is arranged in the hollow region to divide the hollow region into an upper region and a lower region respectively corresponding to the two faces. The upper film is arranged in the upper region, and a first liquid space is between the rigid transparent plate and the upper film. The lower film is arranged in the lower region, a second liquid space is between the rigid transparent plate and the lower film, and the first liquid space is not in communication with the second liquid space. The two fixation members are arranged in the hollow region and respectively correspond to the upper film and the lower film. Each of the two fixation members surrounds a light-permissible region, so that the optical axis of the liquid lens passes through the light-permissible region. The light-permissible liquid is filled in the first liquid space and the second liquid space. The upper film and the lower film are respectively formed as deformable side surfaces.

Each of the two actuators is connected to the liquid lens and comprises a liquid pump and a pipeline. One of the two liquid pumps is in communication with the first liquid space through one of the two pipelines and is adapted to suction the light-permissible liquid from the first liquid space or to pump the light-permissible liquid to the first liquid space. The other one of the two liquid pumps is in communication with the second liquid space through the other one of the two pipelines and is adapted to suction the light-permissible liquid from the second liquid space or to pump the light-permissible liquid to the second liquid space, so that the two actuators drive the upper film and the lower film to be deformed.

According to one or some embodiments of the instant disclosure, the shaping surface directly contacts the deformable side surface of the liquid lens, so that the deformable side surface is deformed according to the profile of the shaping surface. Moreover, according to one or some embodiments of the instant disclosure, the shaping surface is in contact with the deformable side surface in a surface-contact manner. Therefore, the formation of the bent corner can be avoided and the side surface can be configured to have proper curved surface to achieve a predetermined zooming performance. Moreover, according to one or some embodiments, the deformation of the upper film and the lower film can be controlled by suctioning or pumping the liquid lens with the pump, thereby allowing the focal length of the zoom lens module to be changed in a stepless manner.

BRIEF DESCRIPTION OF THE DRAWINGS

This disclosure will become more fully understood from the detailed description given herein below for illustration only and thus not limitative of this disclosure, wherein.

DETAILED DESCRIPTION

Figure 1:
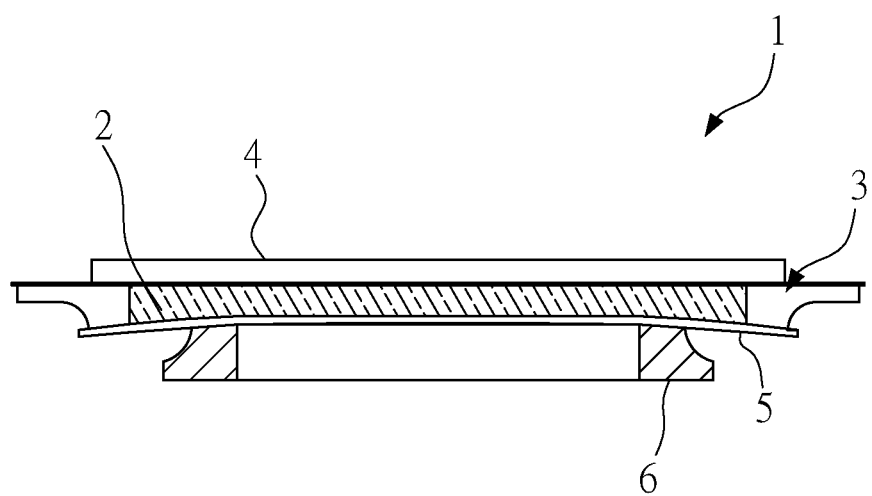
FIG. 1 illustrates a side cross sectional view of a liquid lens known to the inventor.
Figure 2:
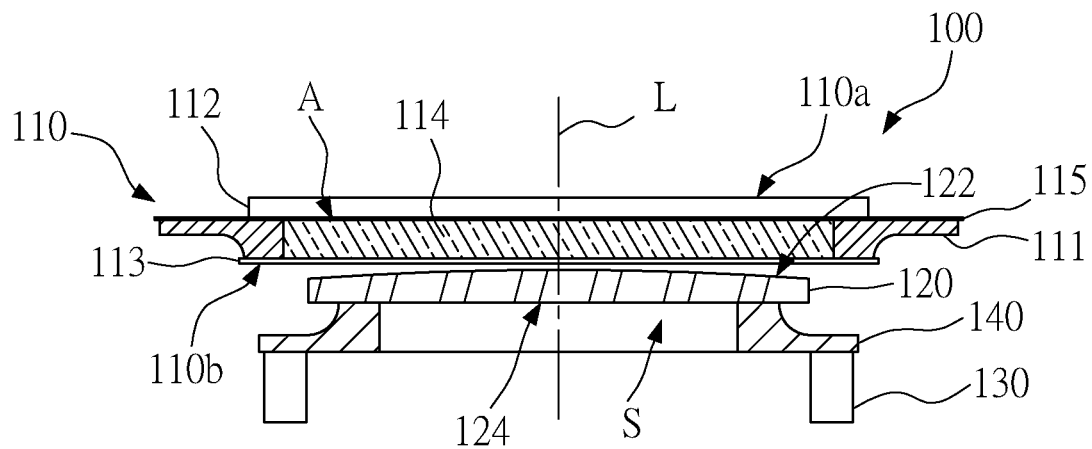
FIG. 2 illustrates a side cross sectional view of a zoom lens module according to a first embodiment of the instant disclosure.
Figure 3:
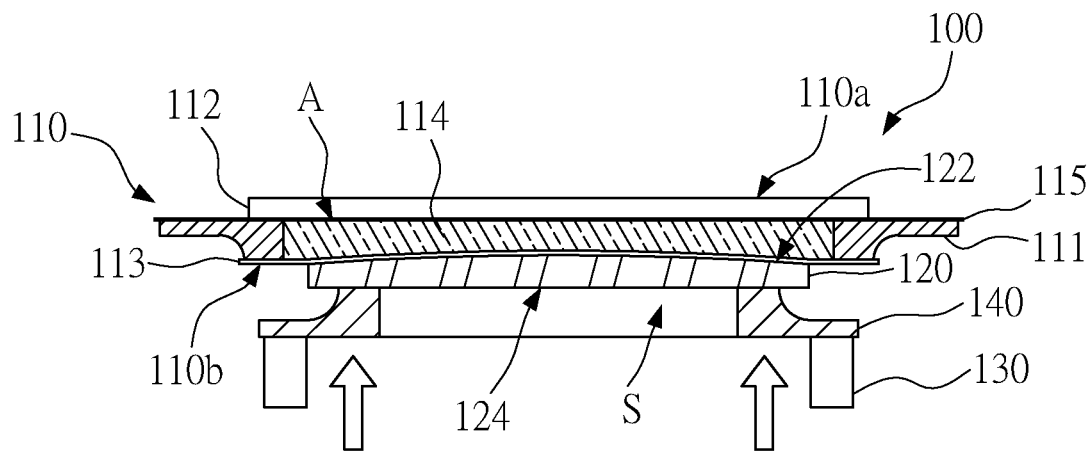
FIG. 3 illustrates a side cross sectional view of the zoom lens module according to the first embodiment of the instant disclosure.

Please refer to FIG. 2 and FIG. 3. A zoom lens module 100 according to a first embodiment of the instant disclosure is illustrated. In this embodiment, the zoom lens module 100 comprises a liquid lens 110, a rigid lens 120, and an actuator 130.

As shown in FIG. 2 and FIG. 3, in this embodiment, the liquid lens 110 has two opposite side surfaces 110a, 110b, and an optical axis L of the liquid lens 110 passes through the two side surfaces 110a, 110b. Moreover, one of the two side surfaces 110a, 110b is a deformable side surface 110b (in this embodiment, the side surface 110b is a deformable). The rigid lens 120 has a shaping surface 122 and a bottom surface 124 opposite to the shaping surface 122. The rigid lens 120 may be arranged inside the liquid lens 110 or outside the liquid lens 110, and the shaping surface 122 of the rigid lens 120 faces the deformable side surface 110b of the liquid lens 110. The shaping surface 122 is not a flat surface and may be an outward convex curved surface or an inward concave curved surface. The actuator 130 is connected to one of the liquid lens 110 and the rigid lens 120, and the actuator 130 is adapted to drive the deformable side surface 110b and the shaping surface 122 to move relative to each other, so that the shaping surface 122 contacts and presses the deformable side surface 110b to be deformed, thus changing the optical properties of the liquid lens 110 and achieving the zooming performance.

As shown in FIG. 2 and FIG. 3, in the first embodiment, the liquid lens 110 has a frame 111, a rigid transparent plate 112, a lower film 113, and a light-permissible liquid 114. The frame 111 has a hollow region A in communication with two faces of the frame 111. The rigid transparent plate 112 and the lower film 113 are respectively at the two faces of the frame 111 to seal the hollow region A. The rigid transparent plate 112 and the lower film 113 are respectively formed as the two side surfaces 110a, 110b of the liquid lens 110. Specifically, in this embodiment, the lower film 113 is formed as the deformable side surface 110b. The light-permissible liquid 114 is filled in the hollow region A. In one embodiment, the liquid lens 110 further comprises an upper film 115 arranged between the frame 111 and the rigid transparent plate 112, and the rigid transparent plate 112 is arranged above the upper film 115, so that the rigid transparent plate 112 is indirectly fixed on the frame 111 through the upper film 115.

As shown in FIG. 2 and FIG. 3, in the first embodiment, the rigid lens 120 is arranged outside the liquid lens 110, and the shaping surface 122 of the rigid lens 120 faces the lower film 113 of the liquid lens 110. In the first embodiment, the shaping surface 122 is an outward convex curved surface; specifically, in one embodiment, the shaping surface 122 may be a spherical surface, but may also be curved surfaces with other profiles. The bottom surface 124 may be a flat surface, an outward convex curved surface, or an inward concave curved surface. The rigid lens 120 is adapted to move toward the lower film 113 of the liquid lens 110, so that the shaping surface 122 contacts the lower film 113. Therefore, the lower film 113 is pressed by the shaping surface 122 and is thus deformed. In this embodiment, through the shaping of the shaping surface 122, the lower film 113 (in this embodiment, the deformable side surface 110b) can be bent to form a predetermined curved surface, so that the zoom lens module 100 can provide a proper optical zooming performance without the formation of the bent corner on which the stress may be concentrated.

As shown in FIG. 2 and FIG. 3, in the first embodiment, the zoom lens module 100 may further comprise a shaping member 140. The rigid lens 120 is arranged on the shaping member 140, and the shaping member 140 is adapted to be moved toward the lower film 113 to drive the shaping surface 122 of the rigid lens 120 to move and to contact the lower film 113, so that the lower film 113 is deformed according to the profile of the shaping surface 122. Hence, the curvature of the portion of the lower film 113 contacting the shaping surface 122 is the same as the curvature of the shaping surface 122, and the profile of the light-permissible liquid 114 in the hollow region A is thus changed, thereby changing the optical properties of the liquid lens 110 to achieve the zooming performance.

As shown in FIG. 2 and FIG. 3, in one embodiment, the shaping member 140 is a circular structure fixed on the bottom surface 124 of the rigid lens 120 and surrounds the light-permissible region S, so that the optical axis L of the liquid lens 110 can pass through the light-permissible region S. In some embodiments, the shaping member 140 may be fixed on an edge region of the rigid lens 120. In one embodiment, the actuator 130 may be a linear actuator connected to the shaping member 140 and adapted to drive the shaping member 140 to move toward the lower film 113. In some embodiments, the actuator 130 may be directly connected to the rigid lens 120 to drive the rigid lens 120 to move toward the lower film 113 directly. In some embodiments, the actuator 130 may be a voice coil motor (VCM), a shape memory alloy (SMA), a piezo motor, or any combinations of two of the foregoing, as long as the actuator 130 can perform the linear actuation along a direction parallel to the optical axis L of the liquid lens 110.

Figure 4:
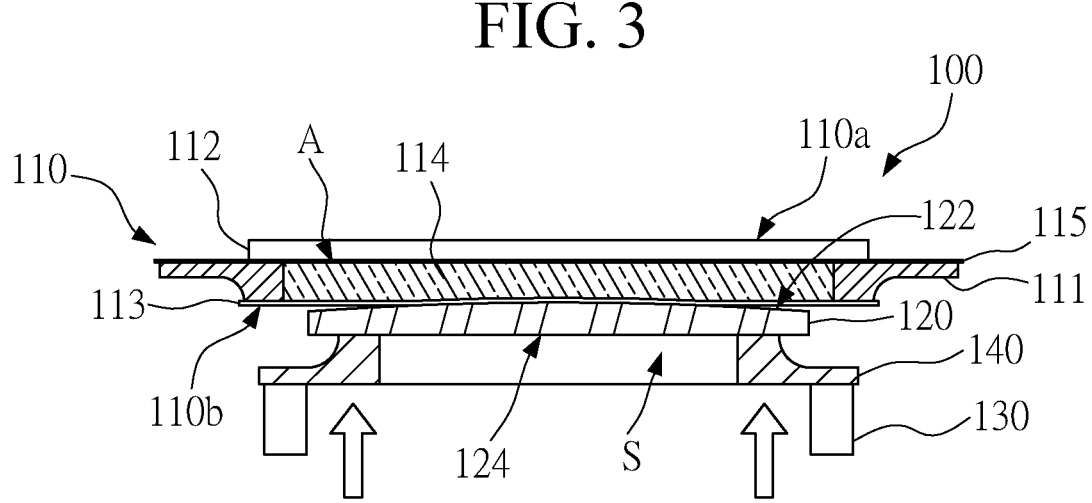
FIG. 4 illustrates a side cross sectional view of the zoom lens module according to the first embodiment of the instant disclosure.

As shown in FIG. 3 and FIG. 4, when the feeding movement of the rigid lens 120 with respect to the lower film 113 changes, the shaping surface 122 contacts the lower film 113 with different extents. Therefore, the profile of the lower film 113 and the overall shape of the liquid lens 110 change according to the feeding movement of the rigid lens 120.

Figure 5:
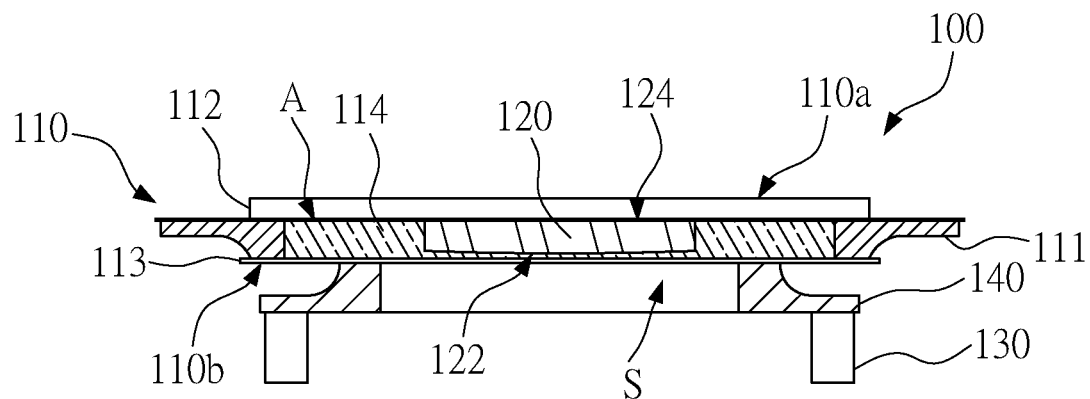
FIG. 5 illustrates a side cross sectional view of a zoom lens module according to a second embodiment of the instant disclosure.
Figure 6:
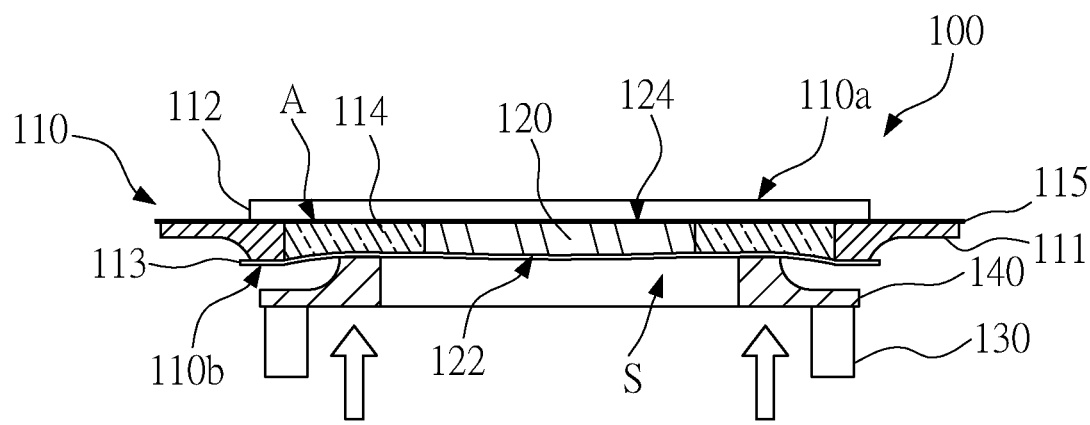
FIG. 6 illustrates a side cross sectional view of the zoom lens module according to the second embodiment of the instant disclosure.

Please refer to FIG. 5 and FIG. 6. A zoom lens module 100 according to a second embodiment of the instant disclosure is illustrated. In this embodiment, the zoom lens module 100 comprises a liquid lens 110, a rigid lens 120, an actuator 130, and a shaping member 140. In the second embodiment, the rigid lens 120 is arranged inside the liquid lens 110 and the shaping surface 122 of the rigid lens 120 faces the lower film 113 of the liquid lens 110. In the second embodiment, the shaping surface 122 is an outward convex curved surface; specifically, in one embodiment, the shaping surface 122 may be a spherical surface, but may also be curved surfaces with other profiles. The actuator 130 is adapted to allow a portion of the lower film 113 to move toward the shaping surface 122 of the rigid lens 120, so that the shaping surface 122 contacts and presses the lower film 113. Therefore, the lower film 113 is pressed by the shaping surface 122 to be deformed and is attached to the shaping surface 122. In this embodiment, through the shaping of the shaping surface 122, the lower film 113 (in this embodiment, the deformable side surface 110b) can be bent to form a predetermined curved surface, so that the zoom lens module 100 can provide a proper optical zooming performance without the formation of the bent corner on which the stress may be concentrated.

As shown in FIG. 5 and FIG. 6, in the second embodiment, the liquid lens 110 has a frame 111, a rigid transparent plate 112, a lower film 113, a light-permissible liquid 114, and an upper film 115. In this embodiment, the structure of the liquid lens 110 is approximately same as the structure of the liquid lens 110 of the first embodiment, which is not iterated here.

As shown in FIG. 5 and FIG. 6, the rigid lens 120 is fixedly arranged in the hollow region A of the frame 111, and the rigid lens 120 is immersed in the light-permissible liquid 114. The shaping surface 122 faces the lower film 113, and the shaping surface 122 is normally spaced from the lower film 113. Alternatively, in one embodiment, the spacing may be omitted, and the shaping surface 122 may be just in contact with the lower film 113 without pressing the lower film 113. In one embodiment, the bottom surface 124 of the rigid lens 120 is directly fixed on the rigid transparent plate 112 or indirectly fixed on the rigid transparent plate 112 through the upper film 115. In some embodiments, the rigid lens 120 is fixed connected to the frame 111 through a connection member.

As shown in FIG. 5 and FIG. 6, in one embodiment, the shaping member 140 is a circular structure outside the liquid lens 110 and arranged fixed on the bottom surface 124 of the rigid lens 120 and corresponds to the lower film 113. The shaping member 140 surrounds a light-permissible region S, so that the optical axis L of the liquid lens 1110 can pass the light-permissible region S. The actuator 130 is connected to the shaping member 140, and the actuator 130 is adapted to drive the shaping member 140 to move toward the lower film 113, so that a portion of the lower film 113 is moved toward the shaping surface 122.

As shown in FIG. 6, in this embodiment, when the shaping member 140 is fed to push a portion of the lower film 113, the portion of the lower film 113 is moved toward the shaping surface 122 of the rigid lens 120. Therefore, the rigid lens 120 presses the lower film 113 to allow the lower film 113 to be attached to the shaping surface 122 of the rigid lens 120. Hence, the lower film 113 is deformed according to the shaping member 140 to be a curved surface with a proper curvature. Moreover, when the feeding movement of the rigid lens 120 with respect to the lower film 113 changes, the shaping surface 122 contacts the lower film 113 with different extents. Therefore, the profile of the lower film 113 and the overall shape of the liquid lens 110 change according to the feeding movement of the rigid lens 120.

Figure 7:
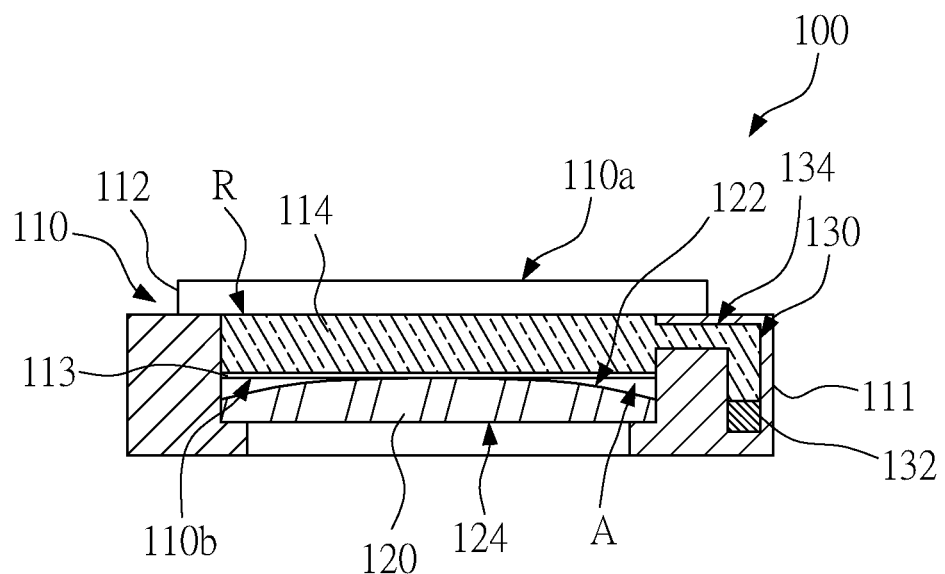
FIG. 7 illustrates a side cross sectional view of a zoom lens module according to a third embodiment of the instant disclosure.
Figure 8:
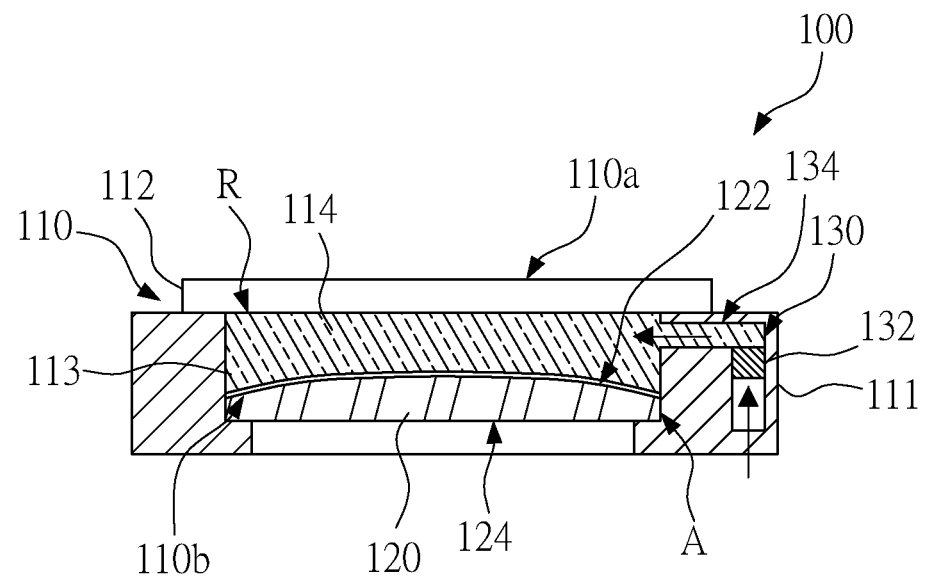
FIG. 8 illustrates a side cross sectional view of the zoom lens module according to the third embodiment of the instant disclosure.

Please refer to FIG. 7 and FIG. 8. A zoom lens module 100 according to a third embodiment of the instant disclosure is illustrated. In this embodiment, the zoom lens module 100 comprises a liquid lens 110, a rigid lens 120, and an actuator 130.

As shown in FIG. 7 and FIG. 8, in the third embodiment, the liquid lens 110 has a frame 111, a rigid transparent plate 112, a lower film 113, and a light-permissible liquid 114. The frame 111 has a hollow region A in communication with two faces of the frame 111. The rigid transparent plate 112 is arranged on one of the two faces. The lower film 113 is arranged in the hollow region A, and a liquid space R is between the rigid transparent plate 112 and the lower film 113. In other words, in this embodiment, the rigid transparent plate 112, the lower film 113, and the frame 111 together define the liquid space R. The light-permissible liquid 114 is filled in the liquid space R, the lower film 113 is formed as the deformable side surface 110b, and the rigid transparent plate 112 is formed as the other side surface 110a.

As shown in FIG. 7 and FIG. 8, the rigid lens 120 has a shaping surface 122 and a bottom surface 124 opposite to the shaping surface 122. The rigid lens 120 is fixed in the frame 111 and is outside the liquid space R. The shaping surface 122 of the rigid lens 120 faces the lower film 113 of the liquid lens 110 (that is, in this embodiment, the deformable side surface 110b), and the shaping surface 122 is normally spaced from the lower film 113. Alternatively, in one embodiment, the spacing may be omitted, and the shaping surface 122 may be just in contact with the lower film 113 without pressing the lower film 113. The shaping surface 122 is a curved surface. In the third embodiment, the shaping surface 122 is an outward convex curved surface; specifically, in one embodiment, the shaping surface 122 may be a spherical surface, but may also be curved surfaces with other profiles. The bottom surface 124 may be a flat surface, an outward convex curved surface, or an inward concave curved surface.

As shown in FIG. 7 and FIG. 8, in the third embodiment, the actuator 130 comprises a liquid pump 132 and a pipeline 134. The liquid pump 132 is in communication with the liquid space R through the pipeline 134. The liquid pump 132 is adapted to suction the light-permissible liquid 114 from the liquid space R or to pump the light-permissible liquid 114 to the liquid space R, so that an amount of the light-permissible liquid 114 in the liquid space R is adjustable. In the third embodiment, the pipeline 134 is a portion of the frame 111, and the liquid pump 132 is embedded in the frame 111. In some embodiments, the liquid pump 132 and the pipeline 134 are arranged outside the frame 111.

As shown in FIG. 8, in this embodiment, the liquid pump 132 pumps the light-permissible liquid 114 to the liquid space R through the pipeline 134 to increase the amount of the light-permissible liquid 114 in the liquid space R. Then, the liquid space R expands outwardly to push the lower film 113 to move toward the rigid lens 120, so that the lower film 113 is deformed and further contacts the shaping surface 122 of the rigid lens 120. Thereafter, along with the outward and continuous expansion of the liquid space R, the lower film 113 is eventually attached to the shaping surface 122, so that the lower film 113 and the shaping surface 122 have the same curved profile, thus changing the profile of the light-permissible liquid 114 in the liquid lens 110.

Figure 9:
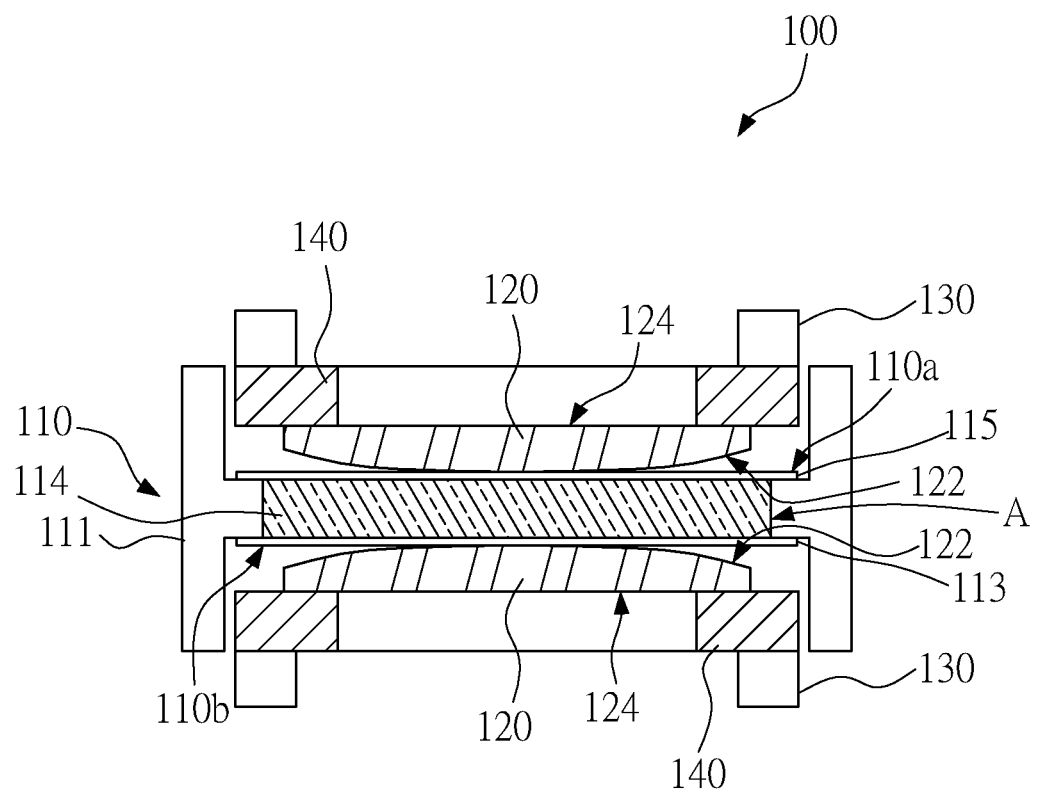
FIG. 9 illustrates a side cross sectional view of a zoom lens module according to a fourth embodiment of the instant disclosure.

Please refer to FIG. 9. A zoom lens module 100 according to a fourth embodiment of the instant disclosure is illustrated. In this embodiment, the zoom lens module 100 comprises a liquid lens 110, two rigid lenses 120, and two actuators 130.

As shown in FIG. 9, in this embodiment, both the two side surfaces 110a, 110b of the liquid lens 110 are deformable side surfaces 110a, 110b. The two rigid lenses 120 are respectively arranged outside the liquid lens 110. The shaping surface 122 of each of the two rigid lenses 120 faces a corresponding one of the two deformable side surfaces 110a, 110b. The two actuators 130 are respectively connected to the two rigid lenses 120 (in this embodiment, in a one-by-one relationship), so that each of the two actuators 130 is adapted to drive a corresponding one of the two rigid lenses 120 to move toward a corresponding one of the two deformable side surfaces 110a, 110b. Therefore, each of the two shaping surfaces 122 contacts and presses the corresponding one of the two deformable side surfaces 110a, 110b to be deformed. Hence, the optical properties of the liquid lens 110 can be changed thereby achieving the zooming performance.

As shown in FIG. 9, in the fourth embodiment, the liquid lens 110 has a frame 111, an upper film 115, a lower film 113, and a light-permissible liquid 114. The frame 111 has a hollow region A in communication with two faces of the frame 111. The upper film 115 and the lower film 113 are respectively arranged on the two faces of the frame 111 to seal the hollow region A. Moreover, the upper film 115 and the lower film 113 are respectively formed as the two side surfaces 110a, 110b of the liquid lens 110. Especially, in this embodiment, the upper film 115 and the lower film 113 are respectively formed as the deformable side surfaces 110a, 110b. The light-permissible liquid 114 is filled in the hollow region A.

As shown in FIG. 9, in the fourth embodiment, the two rigid lenses 120 are arranged outside the liquid lens 110, and the two shaping surfaces 122 of the two rigid lenses 120 respectively face the upper film 115 and the lower film 113. In this embodiment, the zoom lens module 100 further comprises two shaping members 140. Each of the two rigid lenses 120 is arranged on a corresponding one of the two shaping members 140. Each of the two actuators 130 is a linear actuator connected to a corresponding one of the two shaping members 140 and is adapted to drive the corresponding one of the two shaping members 140 to move toward the upper film 115 or the lower film 113. In some embodiments, each of the two actuators 130 may be directly connected to the corresponding one of the two rigid lenses 120 to drive the corresponding one of the two rigid lenses 120 to move toward the upper film 115 or the lower film 113 directly. Moreover, when the feeding movement of the rigid lenses 120 with respect to the lower film 113 or the upper film 115 changes, the shaping surfaces 122 contacts the lower film 113 or the upper film 115 with different extents. Therefore, the profile of the lower film 113 or the upper film 115 and the overall shape of the liquid lens 110 change according to the feeding movement of the rigid lenses 120.

Figure 10:
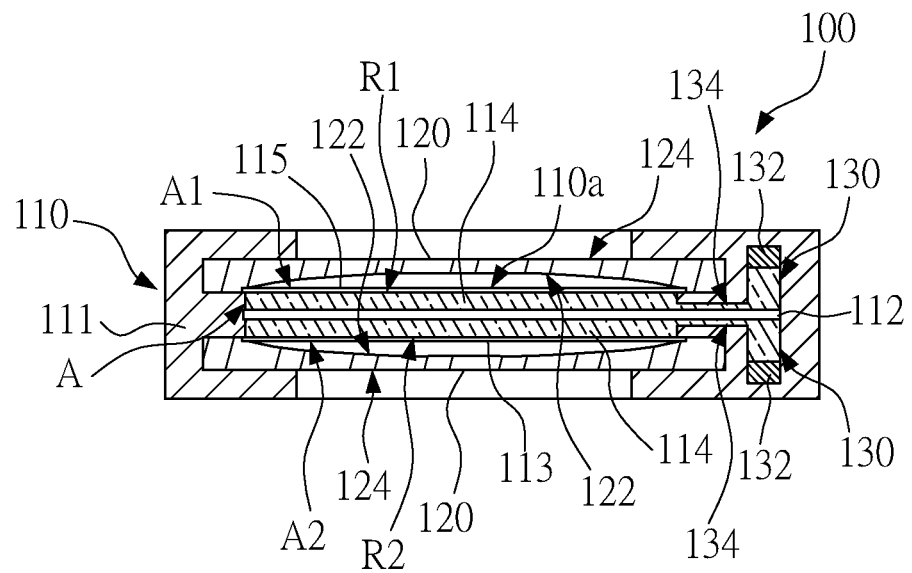
FIG. 10 illustrates a side cross sectional view of the zoom lens module according to a fifth embodiment of the instant disclosure.
Figure 11:
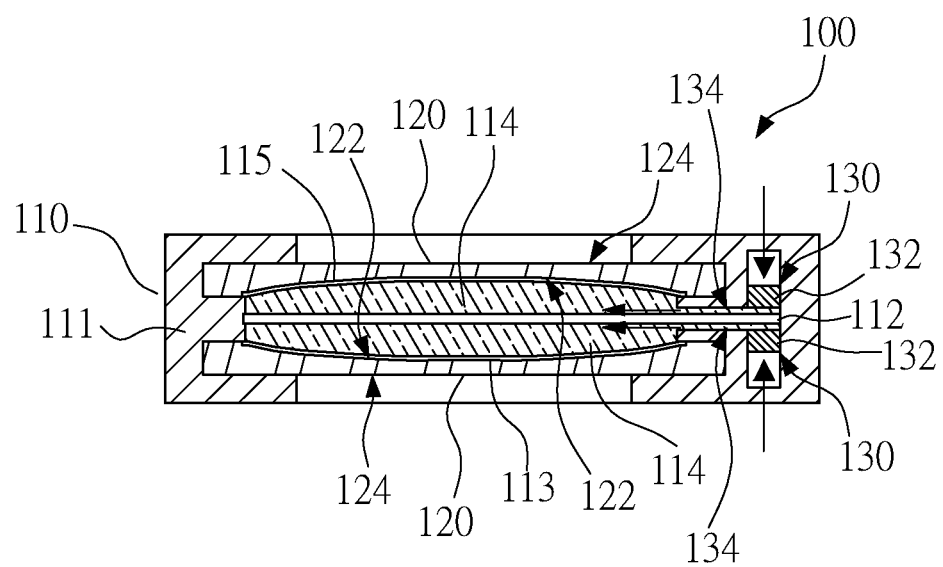
FIG. 11 illustrates a side cross sectional view of a zoom lens module according to the fifth embodiment of the instant disclosure.

Please refer to FIG. 10 and FIG. 11. A zoom lens module 100 according to a fifth embodiment of the instant disclosure is illustrated. In this embodiment, the zoom lens module 100 comprises a liquid lens 110, two rigid lenses 120, and two actuators 130.

As shown in FIG. 10 and FIG. 11, the liquid lens 110 has a frame 111, a rigid transparent plate 112, an upper film 115, a lower film 113, and a light-permissible liquid 114. The frame 111 has a hollow region A in communication with two faces of the frame 111. The rigid transparent plate 112 is arranged in the hollow region A to divide the hollow region A into an upper region A1 and a lower region A2 respectively corresponding to the two faces.

The upper film 115 is arranged in the upper region A1, and a first liquid space R1 is between the rigid transparent plate 112 and the upper film 115. The lower film 113 is arranged in the lower region A2, and a second liquid space R2 is between the rigid transparent plate 112 and the lower film 113. The first liquid space R1 is not in communication with the second liquid space R2. The light-permissible liquid 114 is filled in the first liquid space R1 and the second liquid space R2. The upper film 115 and the lower film 113 are respectively formed as the deformable side surfaces 110a, 110b.

As shown in FIG. 10 and FIG. 11, each of the two rigid lenses 120 has a shaping surface 122 and a bottom surface 124 opposite to the shaping surface 122. The two rigid lenses 120 are fixed in the frame 111 and outside the first liquid space R1 and the second liquid space R2. The shaping surfaces 122 of the two rigid lenses 120 respectively face the upper film 115 and the lower film 113 (that is, in this embodiment, the deformable side surfaces 110a, 110b). In the fifth embodiment, the shaping surface 122 is an inward concave curved surface, but may also be curved surfaces with other profiles. The bottom surface 124 may be a flat surface, an outward convex curved surface.

As shown in FIG. 10 and FIG. 11, in the fifth embodiment, each of the two actuators 130 comprises a liquid pump 132 and a pipeline 134. One of the two liquid pumps 132 is in communication with the first liquid space R1 through one of the two pipelines 134 and is adapted to suction the light-permissible liquid 114 from the first liquid space R1 or to pump the light-permissible liquid 114 to the first liquid space R1. The other one of the two liquid pumps 132 is in communication with the second liquid space R2 through the other one of the two pipelines 134 and is adapted to suction the light-permissible liquid 114 from the second liquid space R2 or to pump the light-permissible liquid 114 to the second liquid space R2, so that an amount of the light-permissible liquid 114 in the first liquid space R1 and an amount of the light-permissible liquid 114 in the second liquid space R2 are adjustable.

As shown in FIG. 11, in this embodiment, the liquid pumps 132 pump the light-permissible liquid 114 to the first liquid space R1 and the second liquid space R2 through the pipelines 134 to increase the amount of the light-permissible liquid 114 in the first liquid space R1 and the amount of the light-permissible liquid 114 in the second liquid space R2. Then, the first liquid space R1 and the second liquid space R2 expand outwardly to push the upper film 115 and the lower film 113 to move toward the rigid lenses 120, so that the upper film 115 and the lower film 113 are deformed and further contact the shaping surfaces 122 of the rigid lenses 120. Thereafter, along with the outward and continuous expansion of the first liquid space R1 and/or the second liquid space R2, the upper film 115 or the lower film 113 is eventually attached to the shaping surfaces 122, so that the lower film 113, the upper film 115, and the shaping surfaces 122 have the same curved profile, thus changing the profile of the light-permissible liquid 114 in the liquid lens 110. It is understood that, the two liquid pumps 132 are not necessarily operated synchronously; in other words, in this embodiment, the amount of the light-permissible liquid 114 in the first liquid space R1 and the amount of the light-permissible liquid 114 in the second liquid space R2 may be configured individually. Moreover, the two shaping surfaces 122 do not necessarily have a same curved profile. Therefore, the profiles of the two side surfaces 110a, 110b of the liquid lens 110 can be adjusted individually, thereby achieving desired optical properties.

Figure 12:
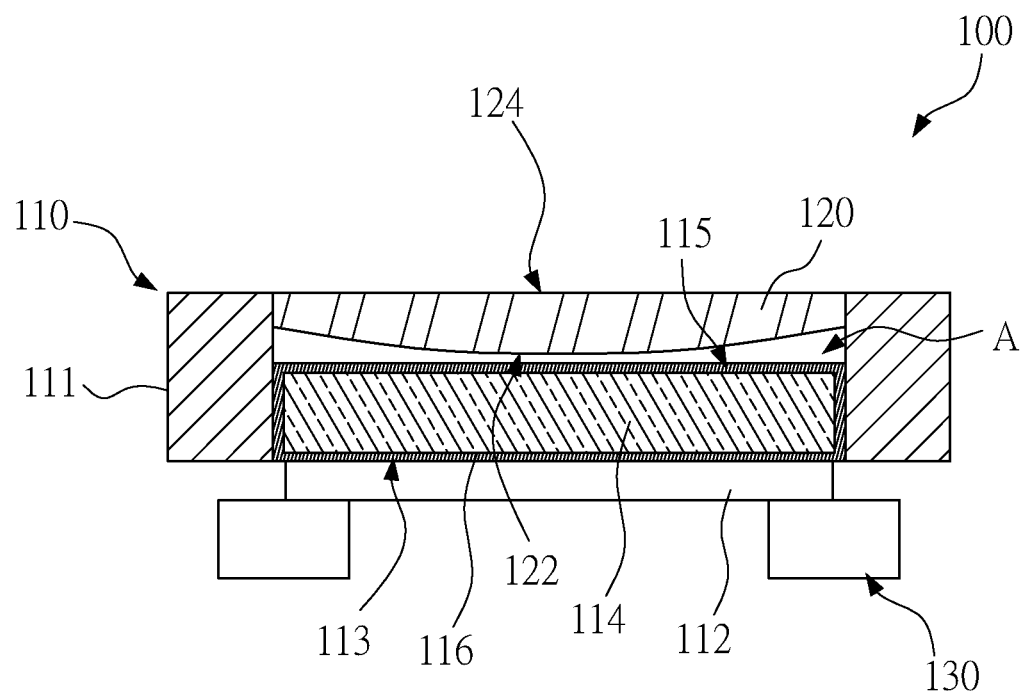
FIG. 12 illustrates a side cross sectional view of a zoom lens module according to a sixth embodiment of the instant disclosure.
Figure 13:
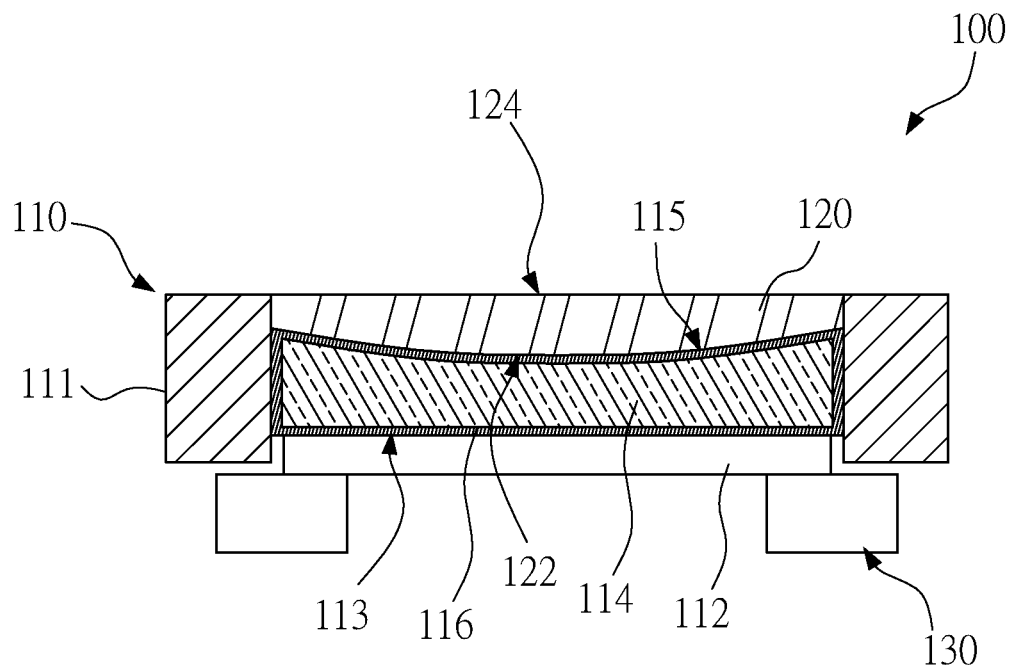
FIG. 13 illustrates a side cross sectional view of the zoom lens module according to the sixth embodiment of the instant disclosure.

Please refer to FIG. 12 and FIG. 13. A zoom lens module 100 according to a sixth embodiment of the instant disclosure is illustrated. In this embodiment, the zoom lens module 100 comprises a liquid lens 110, a rigid lens 120, and an actuator 130.

As shown in FIGS. 12 and 13, the liquid lens 110 has a frame 111, a flexible liquid container 116, a rigid transparent plate 112, and a light-permissible liquid 114. The frame 111 has a hollow region A in communication with two faces of the frame 111. The flexible liquid container 116 is movably arranged in the hollow region A of the frame 111. The flexible liquid container 116 has an upper film 115 and a lower film 113 opposite to the upper film 115. The upper film 115 and the lower film 113 are formed as the two side surfaces of the liquid lens 110 which are two deformable side surfaces. The light-permissible liquid 114 is filled in the flexible liquid container 116. The rigid transparent plate 112 is movably and correspondingly arranged in the hollow region A, and the rigid transparent plate 112 contacts the lower film 113 to support the flexible liquid container 116.

As shown in FIG. 12 and FIG. 13, the rigid lens 120 is arranged on the frame 111 and corresponds to the hollow region A. The shaping surface 122 of the rigid lens 120 faces the upper film 115 of the flexible liquid container 116. In the sixth embodiment, the shaping surface 122 is an outward convex curved surface; specifically, in one embodiment, the shaping surface 122 may be a spherical surface, but may also be curved surfaces with other profiles. The bottom surface 124 may be a flat surface, an outward convex curved surface, or an inward concave curved surface. In the sixth embodiment, the rigid lens 120 is fixedly arranged on the hollow region A, and the shaping surface 122 of the rigid lens 120 faces the upper film 115 of the flexible liquid container 116. As shown, the shaping surface 122 faces the interior of the frame 111 and faces the upper film 115, and the bottom surface 124 faces the exterior of the frame 111.

As shown in FIG. 12 and FIG. 13, the actuator 130 is a linear actuator connected to the rigid transparent plate 112, and the actuator 130 is adapted to drive the rigid transparent plate 12 to move toward the rigid lens 120, so that the flexible liquid container 116 is lifted up by the actuator 130 to drive the upper film 115 to move toward the shaping surface 122.

As shown in FIG. 13, along with the upward lifting of the flexible liquid container, the upper film is pressed by the shaping surface and gradually attached to the shaping surface, so that the upper film and the shaping surface have the same curved profile, thus changing the profile of the light-permissible liquid 114 in the liquid lens 110.

In one or some embodiments, the rigid lens 120 is fixedly arranged on the frame 111 and is not moved with respect to the frame 111. Therefore, the rigid lens 120 can be prevented from being shifted to cause the shift of the optical path. Especially, in one embodiment, to prevent the optical axis L of the rigid lens 120 from having deflection or translation which thus causes the optical axis L of the rigid lens 120 cannot be arranged on a predetermined position. Therefore, in this embodiment, the rigid transparent plate 112 is served as a movable end to drive the flexible liquid container 116, and the rigid lens 120 is served as a fixed end. Hence, the rigid transparent plate 112 drives the flexible liquid container 116 to allow the upper film 115 to fill the void of the rigid lens 120 to achieve a proper curvature change and to preventing the optical axis L of the rigid lens 120 from having deflection or translation.

Figure 14:
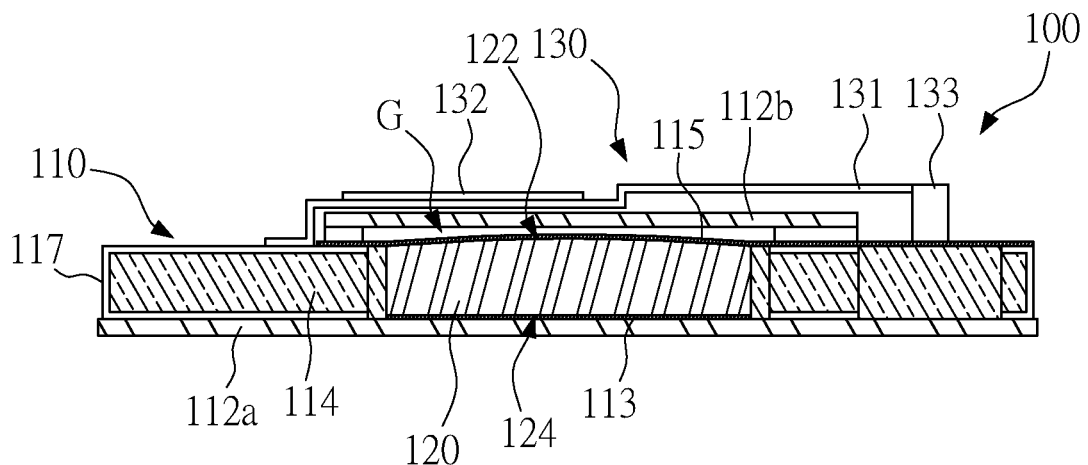
FIG. 14 illustrates a side cross sectional view of a zoom lens module according to a seventh embodiment of the instant disclosure.
Figure 15:
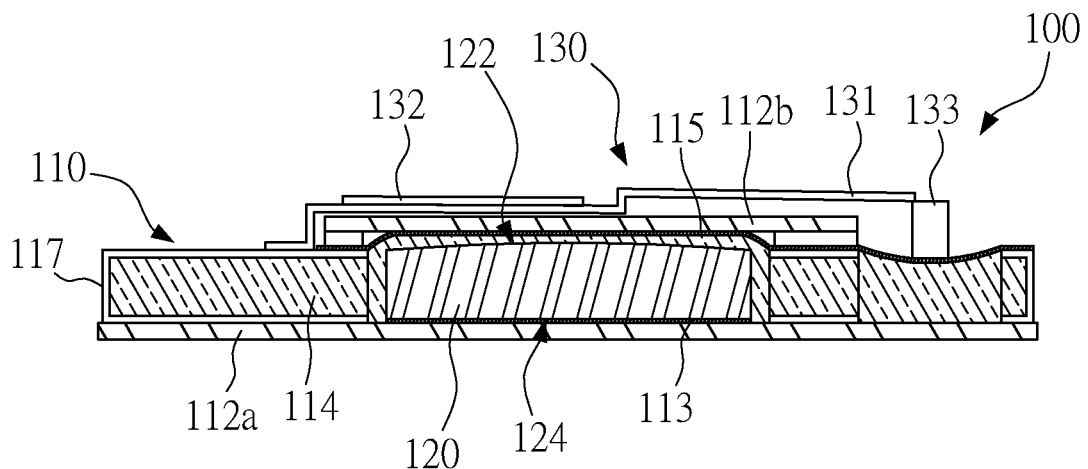
FIG. 15 illustrates a side cross sectional view of the zoom lens module according to the seventh embodiment of the instant disclosure.

Please refer to FIG. 14 and FIG. 15. A zoom lens module 100 according to a seventh embodiment of the instant disclosure is illustrated. In this embodiment, the zoom lens module comprises a liquid lens 110, a rigid lens 120, and an actuator 130.

As shown in FIG. 14 and FIG. 15, the liquid lens 110 has a liquid container 117', a lower rigid transparent plate 112a, an upper rigid transparent plate 112b, and a light-permissible liquid 114. The liquid container 117' has an upper film 115 and a lower film 113. The upper film 115 and the lower film 113 are flexible and formed as the two deformable side surfaces of the liquid lens 110. The light-permissible liquid 114 is filled in the liquid container 117', and the upper film 115 and the lower film 113 enclose the light-permissible liquid 114. The lower rigid transparent plate 112a is adapted to contact the lower film 113 to support the liquid container 117', so that the profile of the other side surface of the liquid lens formed by the lower film is maintained and not deformed.

As shown in FIG. 14 and FIG. 15, the rigid lens 120 is arranged in the liquid container 117', the bottom surface 124 contacts the lower film 113, and the rigid lens 120 is immersed in the light-permissible liquid 114. The shaping surface 122 of the rigid lens 120 contacts the upper film 115, so that the upper film 115 is normally attached to the shaping surface 122. Therefore, the upper film 115 and the shaping surface 122 have the same curvature. In the seventh embodiment, the shaping surface 122 is an outward convex curved surface; specifically, in one embodiment, the shaping surface 122 may be a spherical surface, but may also be curved surfaces with other profiles. The bottom surface 124 may be a flat surface, and the bottom surface 124 is directly or indirectly fixed on the lower rigid transparent plate 112a. Therefore, the bottom surface 124 is supported by the lower rigid transparent plate 112a, and the position of the rigid lens 120 on the optical axis is fixed. The upper rigid transparent plate 112b is arranged above the upper film 115, and is spaced from the upper film 115 by a gap G.

As shown in FIG. 14 and FIG. 15, the actuator 130 has a suspension arm 131, a press block 132', and a piezoelectric element 133. One of two ends of the suspension arm 131 is fixed to the liquid container 117', and the other end of the suspension arm 131 is a free end. The press block 132' is arranged on the free end of the suspension arm 131 and corresponds to a portion of the upper film 115 (where the portion of the upper film 115 corresponding to the press block 132' may be any portion of the upper film 115). The piezoelectric element 133 is arranged on the suspension arm 131 to drive the suspension arm 131 to be deformed, thereby driving the press block 132' to press the portion of the upper film 115.

As shown in FIG. 14, when the actuator 130 is not in operation, the upper film 115 is gradually attached to the shaping surface 122, so that the upper film 115 and the shaping surface 122 have the same curved profile.

As shown in FIG. 15, when the actuator 130 is in operation, the light-permissible liquid 114 is filled between the upper film 115 and the shaping surface 122, so that the profile of the liquid lens 110 is changed to tune the optical properties of the liquid lens 110. Along with the outward expansion and deformation of the upper film 115, the gas in the gap G can be discharged out, so that the upper film 115 is gradually attached to the upper rigid transparent plate 112b. In some embodiments, the upper rigid transparent plate 112b may be replaced by another rigid lens having another shaping surface facing the upper film 115. Therefore, after the upper film 115 is expanded and deformed outwardly, the upper film 115 is gradually attached to another shaping surface to have another surface curvature. In some embodiments, the actuator 130 may be a liquid pump directly suctions or pumps the light-permissible liquid 114 out of or into the liquid container 117'.

Figure 16:
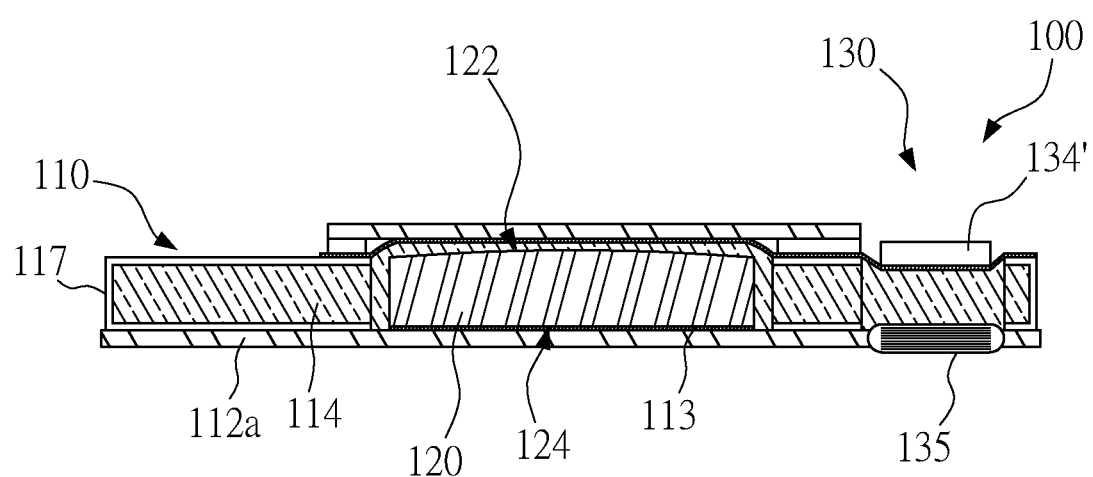
FIG. 16 illustrates a side cross sectional view of an actuator according to one embodiment of the instant disclosure.

As shown in FIG. 16, one embodiment of the actuator 130 is illustrated. The actuator 130 has a magnetic member 134' and a magnetic coil 135. The magnetic member 134' is fixed on a portion of the upper film 115, the magnetic coil 135 is assembled with the lower rigid transparent plate 112a and indirectly corresponds to the magnetic member 134' though the liquid lens 110. The magnetic coil 135 is adapted to receive electricity to generate a magnetic force to attract the magnetic member 134', so that the magnetic member 134' presses the portion of the upper film 115 to further press the light-permissible liquid 114. Therefore, the light-permissible liquid 114 is filled between the upper film 115 and the shaping surface 122.

As shown in FIG. 14 and FIG. 15, both before and after the operation of the actuator 130, the upper film 115 is attached to the rigid lens 120 or the upper rigid transparent plate 112b. Therefore, the surface curvature of the upper film 115 can be controlled effectively. Therefore, the positions in the two-step optical zooming can be further precisely located, rather than merely relying on the deformation of the thin film with its material property. Hence, the precision of the zooming and focusing function of the zoom lens module 100 can be further improved.

Figure 17:
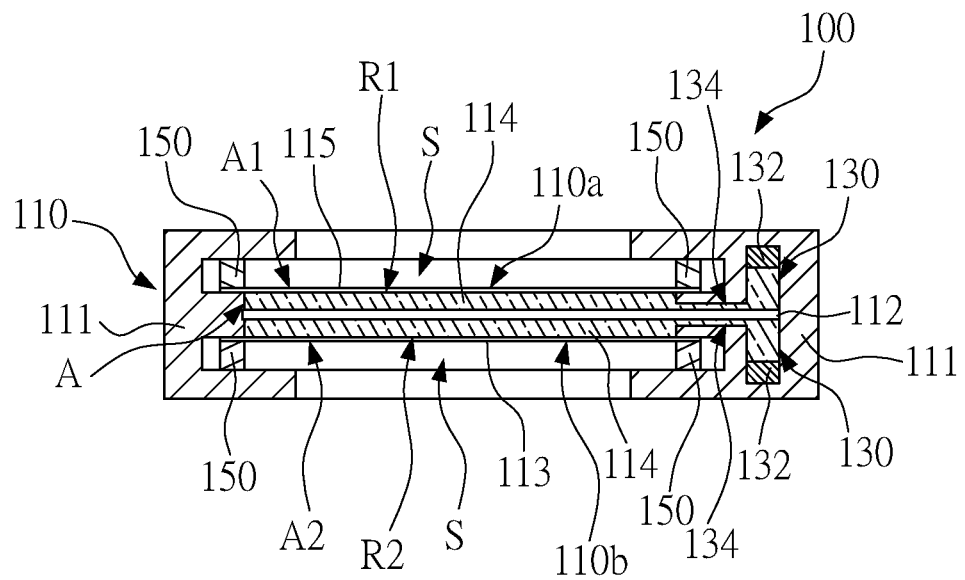
FIG. 17 illustrates a side cross sectional view of a zoom lens module according to an eighth embodiment of the instant disclosure.
Figure 18:
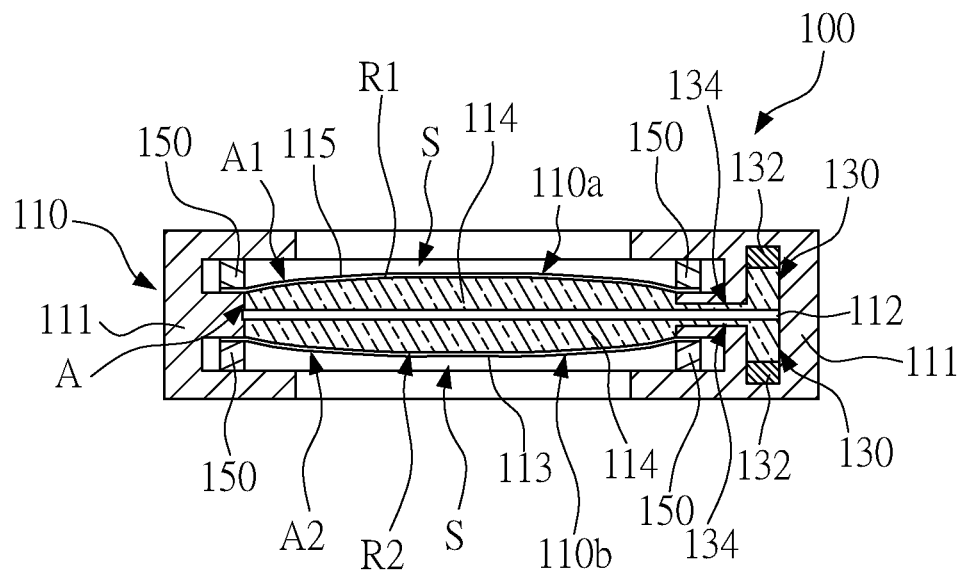
FIG. 18 illustrates a side cross sectional view of the zoom lens module according to the eighth embodiment of the instant disclosure.

Please refer to FIG. 17 and FIG. 18. A zoom lens module 100 according to an eighth embodiment of the instant disclosure is illustrated. In this embodiment, the zoom lens module 100 comprises a liquid lens 110 and two actuators 130.

The liquid lens 110 has two opposite side surfaces 110a, 110b. The optical axis of the liquid lens 110 passes through the two side surfaces 110a, 110b, and at least one of the two side surfaces 110a, 110b is a deformable side surface. The liquid lens 110 comprises a frame 111, a rigid transparent plate 112, an upper film 115, a lower film 113, two fixation members 150, and a light-permissible liquid 114. The frame 111 has a hollow region A in communication with two faces of the frame 111. The rigid transparent plate 112 is arranged in the hollow region A to divide the hollow region A into an upper region A1 and a lower region A2 respectively corresponding to the two faces. The upper film 115 is arranged in the upper region A1, and a first liquid space R1 is between the rigid transparent plate 112 and the upper film 115. The lower film 113 is arranged in the lower region A2, a second liquid space R2 is between the rigid transparent plate 112 and the lower film 113, and the first liquid space R1 is not in communication with the second liquid space R2. The two fixation members 150 are arranged in the hollow region A and respectively correspond to the upper film 115 and the lower film 113. Each of the two fixation members 150 surrounds a light-permissible region S, so that the optical axis of the liquid lens 110 passes through the light-permissible region S. The light-permissible liquid 114 is filled in the first liquid space R1 and the second liquid space R2, and the upper film 115 and the lower film 113 are respectively formed as deformable side surfaces 110a, 110b.

Each of the two actuators 130 is connected to the liquid lens 110, and each of the two actuators 130 comprises a liquid pump 132 and a pipeline 134. One of the two liquid pumps 132 is in communication with the first liquid space R1 through one of the two pipelines 134 and is adapted to suction the light-permissible liquid 114 from the first liquid space R1 or to pump the light-permissible liquid 114 to the first liquid space R1. The other one of the two liquid pumps 134 is in communication with the second liquid space R2 through the other one of the two pipelines 134 and is adapted to suction the light-permissible liquid 114 from the second liquid space R2 or to pump the light-permissible liquid 114 to the second liquid space R2, so that the two actuators 130 drive the upper film 115 and the lower film 113 to be deformed, thereby allowing the focal length of the zoom lens module to be changed in a stepless manner.

According to one or some embodiments of the instant disclosure, the shaping surface 122 directly contacts the deformable side surface 110a/110b of the liquid lens 110, so that the deformable side surface 110a/1110b is deformed according to the profile of the shaping surface 122. Moreover, according to one or some embodiments of the instant disclosure, the shaping surface 122 is in contact with the deformable side surface 110a/110b in a surface-contact manner. Therefore, the formation of the bent corner can be avoided and the side surface 110*a*/110*b* can be configured to have proper curved surface to achieve a predetermined zooming performance. Moreover, according to one or some embodiments, the deformation of the upper film 115 and the lower film 113 can be controlled by suctioning or pumping the liquid lens with the pump 132, thereby allowing the focal length of the zoom lens module 100 to be changed in a stepless manner.

Specifically, in one embodiment, the shaping surface of the rigid lens may be spherical or non-spherical, and the rigid lens may be arranged inside or outside the liquid lens, and the liquid pump or the shaping member is provided to drive the shaping surface to contact the deformable side surface. The exemplary combinations of the exemplary embodiments of the instant disclosure are concluded as the following Table 1.

TABLE 1

| Type | First type | Second type | Third type | Fourth type | Fifth type | Sixth type | Seventh type | Eighth type |
|---|---|---|---|---|---|---|---|---|
| Type of shaping surface | Spherical surface | Spherical surface | Spherical surface | Spherical surface | Non-spherical surface | Non-spherical surface | Non-spherical surface | Non-spherical surface |
| Location of rigid lens | Inside liquid lens | Inside liquid lens | Outside liquid lens | Outside liquid lens | Inside liquid lens | Inside liquid lens | Outside liquid lens | Outside liquid lens |
| Driving manner | liquid pump drives deformable side surface | shaping member pushes deformable side surface | liquid pump drives deformable side surface | shaping member pushes rigid lens to move | liquid pump drives deformable side surface | shaping member pushes deformable side surface | liquid pump drives deformable side surface | shaping member pushes deformable side surface |

What is claimed is:

1. A zoom lens module, comprising:
    a liquid lens having two side surfaces opposite to each other, wherein an optical axis of the liquid lens passes through the two side surfaces, and at least one of the two side surfaces is a deformable side surface;
    a rigid lens having a shaping surface being not flat, wherein the rigid lens is arranged inside or outside the liquid lens, and the shaping surface faces the deformable side surface; and
    an actuator connected to one of the liquid lens and the rigid lens to drive the deformable side surface and the shaping surface to move relative to each other, so that the shaping surface contacts and presses the deformable side surface to be deformed.

2. The zoom lens module according to claim 1, wherein the rigid lens is arranged outside the liquid lens, and the shaping surface is an outward convex curved surface.

3. The zoom lens module according to claim 2, wherein the liquid lens comprises:
    a frame having a hollow region in communication with two faces of the frame;
    a rigid transparent plate and a lower film respectively at the two faces of the frame to seal the hollow region, wherein the rigid transparent plate and the lower film are respectively formed as the two side surfaces of the liquid lens, and the lower film is formed as the deformable side surface; and
    a light-permissible liquid filled in the hollow region.

4. The zoom lens module according to claim 3, further comprising a shaping member, wherein the rigid lens is arranged on the shaping member, and the shaping member is adapted to be moved toward the lower film.

5. The zoom lens module according to claim 4, wherein the actuator is a linear actuator, the linear actuator is connected to the shaping member, and the linear actuator is adapted to drive the shaping member to move toward the lower film.

6. The zoom lens module according to claim 3, wherein the actuator is a linear actuator, the linear actuator is directly connected to the rigid lens, and the linear actuator is adapted to drive the rigid lens to move toward the lower film.

7. The zoom lens module according to claim 1, wherein the rigid lens is arranged inside the liquid lens, and the shaping surface is an outward convex curved surface.

8. The zoom lens module according to claim 7, wherein the liquid lens comprises:
    a frame having a hollow region in communication with two faces of the frame;
    a rigid transparent plate and a lower film respectively at the two faces of the frame to seal the hollow region, wherein the rigid transparent plate and the lower film are respectively formed as the two side surfaces of the liquid lens, and the lower film is formed as the deformable side surface; and
    a light-permissible liquid filled in the hollow region.

9. The zoom lens module according to claim 8, wherein the rigid lens is fixedly arranged in the hollow region and immersed in the light-permissible liquid, and the shaping surface faces the lower film.

10. The zoom lens module according to claim 9, wherein a shaping member is arranged outside the liquid lens and corresponds to the lower film; the shaping member surrounds a light-permissible region, so that the optical axis of the liquid lens passes through the light-permissible region; the actuator is connected to the shaping member to drive the shaping member to move toward the lower film, so that a portion of the lower film is moved toward the shaping surface, and the rigid lens presses the lower film to allow the lower film to attach to the shaping surface.

11. The zoom lens module according to claim 3, wherein the actuator comprises a liquid pump and a pipeline; the liquid pump is in communication with a liquid space through the pipeline, and the liquid pump is adapted to suction the light-permissible liquid from the liquid space or to pump the light-permissible liquid to the liquid space, so that an amount of the light-permissible liquid in the liquid space is adjustable.

12. The zoom lens module according to claim 3, wherein the two side surfaces of the liquid lens are deformable side surfaces, and the zoom lens module comprises two of the rigid lenses and two of the actuators; the two rigid lenses are arranged outside the liquid lens, and the shaping surface of each of the two rigid lenses faces a corresponding one of the two deformable side surfaces; the two actuators are respectively connected to the two rigid lenses, so that each of the two actuators is adapted to drive a corresponding one of the two rigid lenses to move toward a corresponding one of the two deformable side surfaces, and each of the two shaping surfaces contacts and presses the corresponding one of the two deformable side surfaces to be deformed.

13. The zoom lens module according to claim 1, wherein the liquid lens comprises:
   a frame having a hollow region in communication with two faces of the frame;
   an upper film and a lower film respectively at the two faces of the frame to seal the hollow region, wherein the upper film and the lower film are respectively formed as the two deformable side surfaces; and
   a light-permissible liquid filled in the hollow region.

14. The zoom lens module according to claim 1, wherein the zoom lens module comprises two of the rigid lenses and two of the actuators, and the liquid lens comprises:
   a frame having a hollow region in communication with two faces of the frame;
   a rigid transparent plate arranged in the hollow region to divide the hollow region into an upper region and a lower region respectively corresponding to the two faces;
   an upper film arranged on the upper region, wherein a first liquid space is between the rigid transparent plate and the upper film;
   a lower film arranged on the lower region, wherein a second liquid space is between the rigid transparent plate and the lower film, and the first liquid space is not in communication with the second liquid space; and
   a light-permissible liquid filled in the first liquid space and the second liquid space, wherein the upper film and the lower film are respectively formed as deformable side surfaces;
   wherein the rigid lenses are fixed in the frame, and the rigid lenses are arranged outside the first liquid space and the second liquid space, and the two shaping surfaces of the two rigid lenses respectively face the upper film and the lower film.

15. The zoom lens module according to claim 14, wherein each of the two actuators comprises a liquid pump and a pipeline; one of the two liquid pumps is in communication with the first liquid space through one of the two pipelines and is adapted to suction the light-permissible liquid from the first liquid space or to pump the light-permissible liquid to the first liquid space, and the other one of the two liquid pumps is in communication with the second liquid space through the other one of the two pipelines and is adapted to suction the light-permissible liquid from the second liquid space or to pump the light-permissible liquid to the second liquid space, so that an amount of the light-permissible liquid in the first liquid space and an amount of the light-permissible liquid in the second liquid space are adjustable.

16. The zoom lens module according to claim 14, wherein each of the two shaping surfaces is an inward concave curved surface.

17. The zoom lens module according to claim 1, wherein the liquid lens comprises:
   a frame having a hollow region in communication with two faces of the frame;
   a flexible liquid container movably arranged in the hollow region, wherein the flexible liquid container has an upper film and a lower film opposite to the upper film, and the upper film and the lower film are formed as the two side surfaces of the liquid lens;
   a rigid transparent plate movably and correspondingly arranged in the hollow region, wherein the rigid transparent plate contacts the lower film to support the flexible liquid container; and
   a light-permissible liquid filled in the flexible liquid container;
   wherein the rigid lens is arranged on the frame and corresponds to the hollow region, the shaping surface of the rigid lens faces the upper film; the actuator is adapted to drive the rigid transparent plate to move toward the rigid lens, so that the flexible liquid container is lifted up by the actuator to drive the upper film to move toward the shaping surface.

18. The zoom lens module according to claim 1, wherein the liquid lens comprises:
   a liquid container having an upper film, wherein the upper film is flexible and is formed as the deformable side surface;
   a lower rigid transparent plate adapted to support the liquid container; and
   a light-permissible liquid filled in the liquid container;
   wherein the rigid lens is arranged in the liquid container and is immersed in the light-permissible liquid; the shaping surface contacts the upper film, so that the upper film is normally attached to the shaping surface; the actuator is adapted to allow the light-permissible liquid to be filled between the upper film and the shaping surface.

19. The zoom lens module according to claim 18, further comprising an upper rigid transparent plate arranged above the upper film, wherein the upper rigid transparent plate is spaced from the upper film with a gap.

20. The zoom lens module according to claim 18, wherein the liquid container further comprises a lower film; the upper film and the lower film enclose the light-permissible liquid; the lower rigid transparent plate is adapted to contact the lower film to support the liquid container, and a bottom surface of the rigid lens contacts the lower film.

21. A zoom lens module, comprising:
   a liquid lens having two side surfaces opposite to each other, wherein an optical axis of the liquid lens passes through the two side surfaces, and at least one of the two side surfaces is a deformable side surface; the liquid lens comprises:
   a frame having a hollow region in communication with two faces of the frame;
   a rigid transparent plate arranged in the hollow region to divide the hollow region into an upper region and a lower region respectively corresponding to the two faces;
   an upper film arranged in the upper region, wherein a first liquid space is between the rigid transparent plate and the upper film;
   a lower film arranged in the lower region, wherein a second liquid space is between the rigid transparent plate and the lower film, and the first liquid space is not in communication with the second liquid space;
   two fixation members arranged in the hollow region and respectively corresponding to the upper film and the lower film, wherein each of the two fixation members surrounds a light-permissible region, so that the optical axis of the liquid lens passes through the light-permissible region; and
   a light-permissible liquid filled in the first liquid space and the second liquid space, wherein the upper film and the lower film are respectively formed as deformable side surfaces; and
   two actuators respectively connected to the liquid lens, wherein each of the two actuators comprises a liquid pump and a pipeline; one of the two liquid pumps is in communication with the first liquid space through one of the two pipelines and is adapted to suction the light-permissible liquid from the first liquid space or to pump the light-permissible liquid to the first liquid space, and the other one of the two liquid pumps is in communication with the second liquid space through the other one of the two pipelines and is adapted to suction the light-permissible liquid from the second liquid space or to pump the light-permissible liquid to the second liquid space, so that the two actuators drive the upper film and the lower film to be deformed.

\* \* \* \* \*